United States Patent [19]

Li

[11] 4,441,963

[45] * Apr. 10, 1984

[54] DISTILLATION APPARATUS

[76] Inventor: Yao T. Li, Huckleberry Hill, Lincoln, Mass. 01773

[*] Notice: The portion of the term of this patent subsequent to Oct. 28, 1997 has been disclaimed.

[21] Appl. No.: 367,251

[22] Filed: Apr. 7, 1982

Related U.S. Application Data

[63] Continuation of Ser. No. 201,380, Oct. 27, 1980, abandoned, which is a continuation-in-part of Ser. No. 961,452, Nov. 16, 1978, Pat. No. 4,230,529.

[51] Int. Cl.³ .................. B01D 1/22; B01D 1/26; B01D 1/28
[52] U.S. Cl. .................. 202/172; 202/174; 202/175; 202/236; 202/267 R; 159/7; 159/13 A; 159/17 R; 159/25 A; 159/43.1; 159/11.2; 203/11; 203/26; 203/72
[58] Field of Search ............ 159/13, 7, 11, 25, 17, 159/11 A, 25 R, 25 A, 13 A, 17 R, 43 R, DIG. 15; 202/236, 175, 238, 172, 158, 173, 174, 235, 267; 203/10, 11, 26, 86, 72, 89, 25, 19

[56] References Cited

U.S. PATENT DOCUMENTS

| | | | |
|---|---|---|---|
| 2,884,050 | 4/1959 | Brownell | 159/6 |
| 2,894,879 | 7/1959 | Hickman | 202/45 |
| 3,190,817 | 6/1965 | Neugebauer et al. | 202/236 |
| 4,230,529 | 10/1980 | Li | 202/175 |

Primary Examiner—Wilbur L. Bascomb, Jr.
Attorney, Agent, or Firm—Kenway & Jenney

[57] ABSTRACT

Distillation apparatus in which a group of pairs of heat-transfer tubes are each driven to wobble about a vertical axis which passes through a wobbling center. A stream of fluid is directed to flow down inside each tube. The fluid stream tends to cling to the inner surface of the tube away from the wobbling center while it revolves with respect to the tube in response to the wobbling motion. The revolving flow stream wipes the inside surface of the tube to form a thin film which offers low heat resistance to facilitate the evaporation, carries away the residue by its lateral motion and carries the reflux downward with little restriction.

31 Claims, 20 Drawing Figures

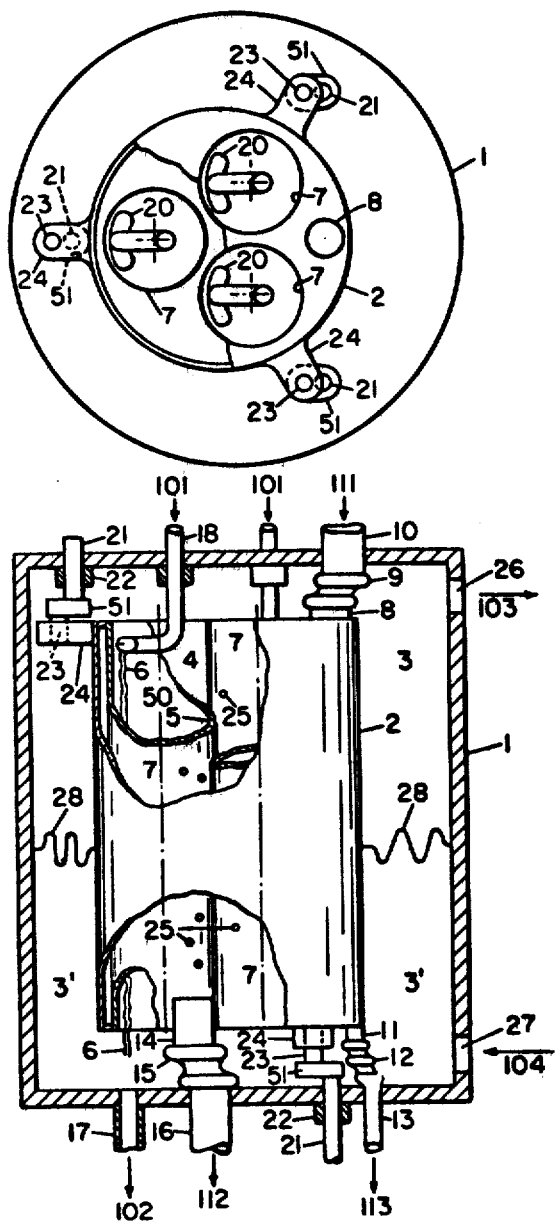
FIG. 1
FIG. 2
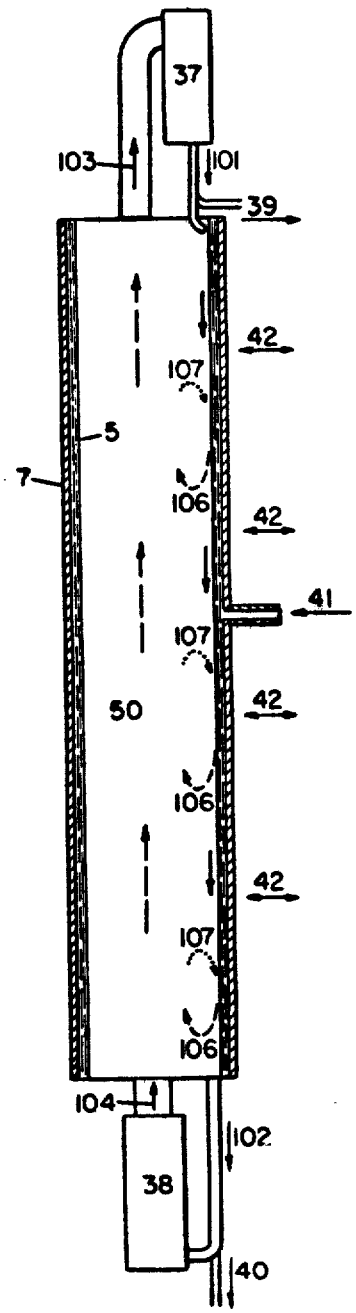
FIG. 7

FIG. 5
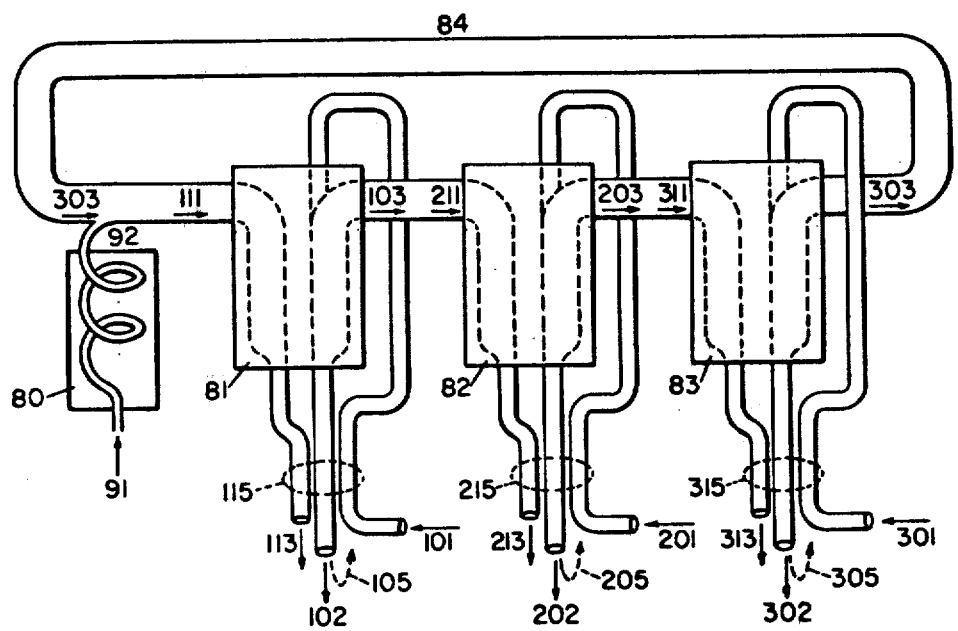
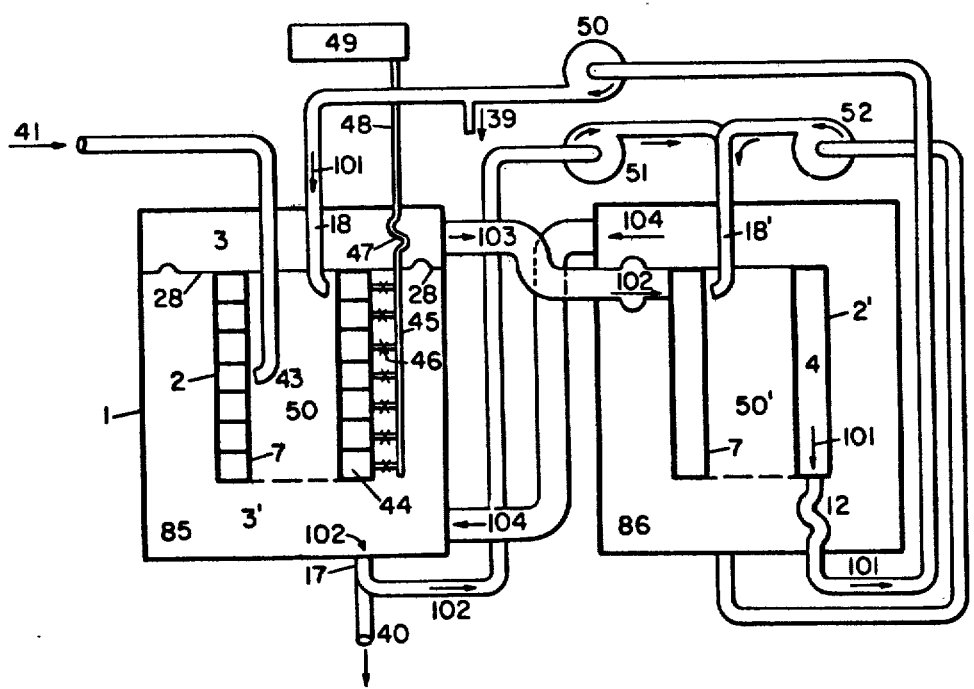
FIG. 8

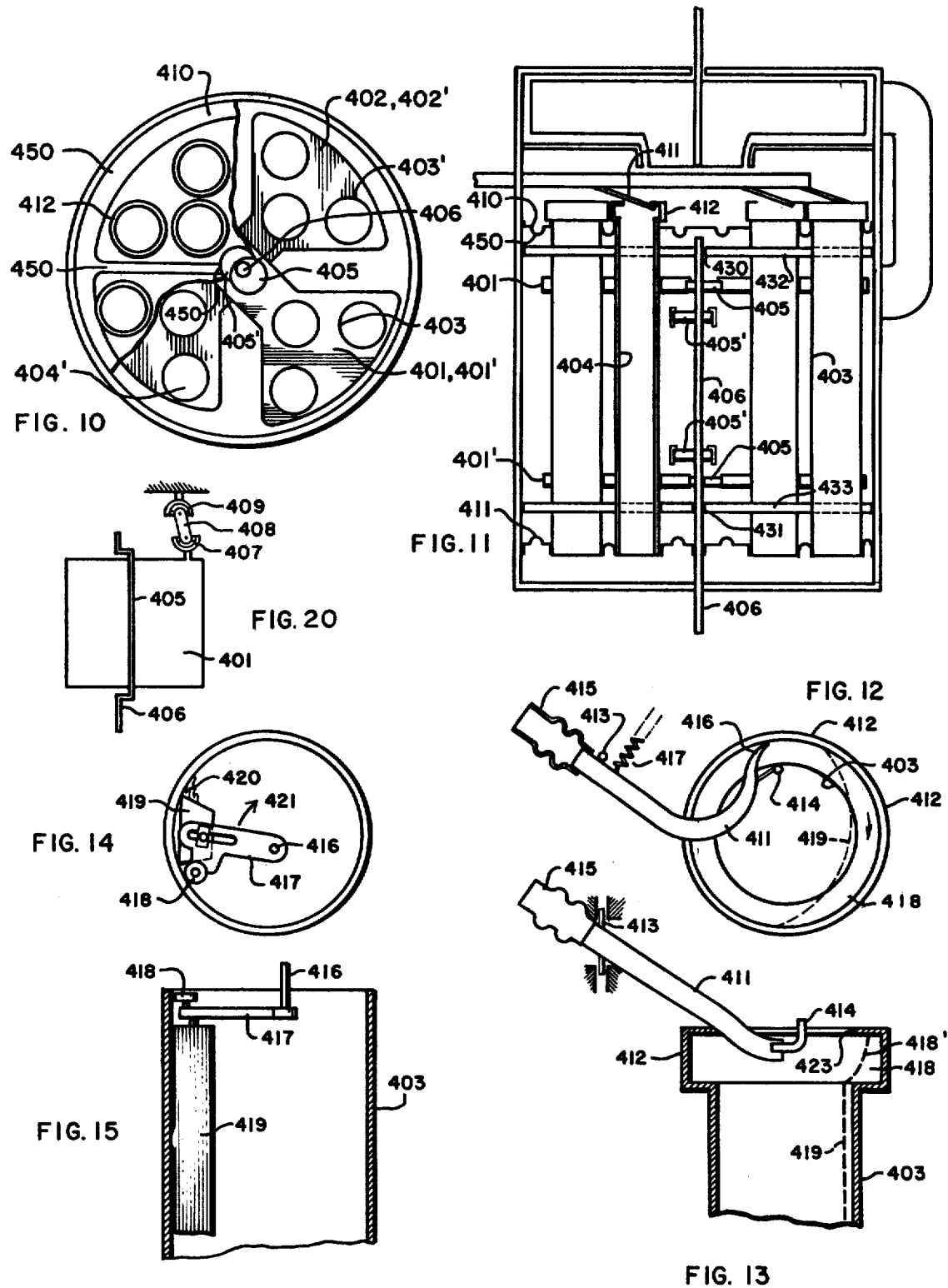

DISTILLATION APPARATUS

REFERENCE TO RELATED APPLICATION

This is a continuation of application Ser. No. 201,380, filed Oct. 27, 1980, and now abandoned, which in turn is a continuation-in-part of U.S. application Ser. No. 961,452, entitled "Distillation Apparatus", filed Nov. 16, 1978, by the same inventor, now U.S. Patent No. 4,230,529.

BACKGROUND OF THE INVENTION

This invention is an improvement over the existing art for the evaporation or distillation of fluids. It may be used for concentration by removing part of the liquid (as in orange juice), for desalination by condensing the water vapor, or for distillation by separating the various ingredients in the fluid (as in alcohol and water). In all these applications the evaporation (or condensation) of the fluid occurs primarily at the interface between the liquid and its vapor while the needed energy is transmitted from a heat source through the container wall to the liquid and then through the liquid to the interface to support the evaporation.

The basic concept of distillation of sea water or other fluids, with or without vapor compression, is not new. However existing distillation systems require a substantial energy input to heat fluids and drive any compressors. Additionally, there is a substantial temperature gradient per stage which limits the number of stages usable with a given temperature rise or energy input and correspondingly limits the output.

It is an object of the present invention to reduce the power required and accordingly reduce the operating cost of the apparatus.

A further object is to lower the heat resistance of the fluid being evaporated and reduce temperature differentials.

A further object is to supply the energy needed to evaporate the fluid by the condensation of the evaporated vapor.

SUMMARY OF THE INVENTION

Novel distillation apparatus according to the present invention comprises pairs of wobbling thin-walled tubes to evaporate the fluid flowing inside the wobbling tubes with the heat energy supplied by condensing the stream of vapor which surrounds the outside surface of the tubes. The condensates that form droplets outside the tubes will be thrown off by the wobbling motion and splashed between the tubes to activate further condensation. Thus the wobbling motion of the tube, similar to the circular motion of tea inside a wobbling tea cup, effectively reduces the temperature difference between the vapor outside the tubes and the vapor inside the tubes. Consequently less energy or less equipment is needed for a given task than with conventional equipment. Vapor and fluid interconnections appropriate to the desired distillation system are provided.

BRIEF DESCRIPTION OF THE DRAWINGS

The invention and its various features may be more fully understood from the following description in conjunction with the accompanying drawings in which:

FIG. 1 is an end plan view of a wobbling evaporator,

FIG. 2 is an elevation view, with cut out sections, of a wobbling evaporator,

FIG. 5 is an elevation schematic view of cascading wobbling evaporators to be used as desalination system, FIG. 7 is a schematic elevation view of a distillation system, FIG. 8 is an elevation schematic view of two wobbling systems used as a distillation system, FIG. 10 is an end view of a distillation system incorporating pairs of heat transfer tubes, FIG. 11 is a cross section view of distillation apparatus incorporating pairs of heat transfer tubes, FIG. 12 is a schematic end view of a fluid distribution system for the apparatus of FIGS. 10 and 11, FIG. 13 shows schematically further details concerning the apparatus of FIG. 12, FIG. 14 is a schematic end view of apparatus for use with high viscosity fluids, FIG. 15 is an elevation view of the apparatus of FIG. 14, FIG. 20 shows a schematic diagram of a universal joint connecting the frame and a wobbling member.

DESCRIPTION OF PREFERRED EMBODIMENTS

Figure 3:
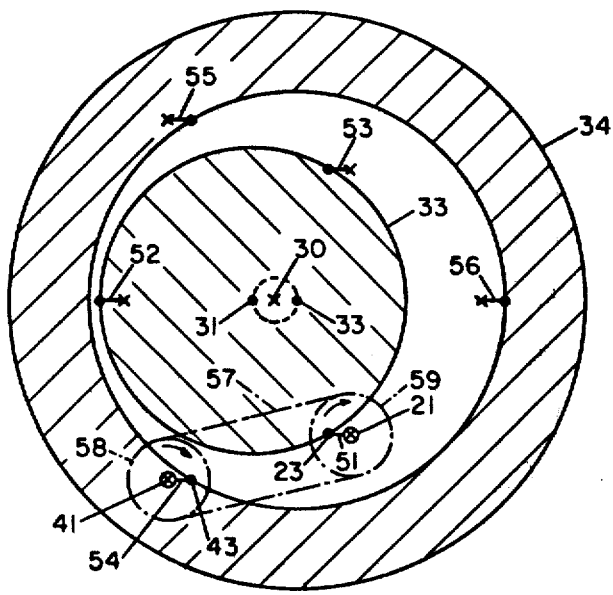
FIG. 3 is an end plan view of two concentric wobbling evaporators to achieve dynamic balancing.

FIG. 1 shows the end view of a generalized wobbling evaporator which consists of an outer shell 1 and a wobbling container 2. Three heat transfer tubes 7 are shown to perform the evaporation and condensation operation. In actual construction several dozens of tubes may be installed in one container.

Three brackets 24 are attached to the ends of the container 2. Three cranks 51 together with three sets of shafts 21 and 23 bearings 22 and 24 are used to guide the container 2 to revolve in the wobbling motion. A motor (not shown) may be used to drive any one of the three shafts 21 to wobble the container 2 as shown in the drawing container 2 is pivoted to arms 51 connected to shafts 21. Thus when any one or more of the three shafts 21 are rotated, the pivot points 23 on container 2 travel through circles defined by the arms 51. The rotation of the points 23 through these small circles causes the container 2 to perform a wobbling motion.

Referring now to FIG. 2, fluid to be evaporated is represented by arrow 101 which flows into tube 18 which revolves in bushing 19. The center of bushing 19 is also the center of wobbling for tube 7. Thus, the wobbling motion of tube 7 will drive the "L" shaped pipe 18 to revolve in the bushing 19 and discharge the fluid from the head 20 at the far side of the tube 7 from the wobbling center.

The fluid discharge from head 20 becomes fluid stream 6 which revolves inside tube 7 and discharges to chamber 3' and then flows out through pipe 17 as represented by arrow 102.

Tube 7 wobbles but does not revolve. Thus the revolving stream 6 coats the inside surface of tube 7 with a thin film 5 which readily evaporates into vapor and escapes from the two ends of tube 7. The upper ends of tube 7 connect to chamber 3 and exit through opening 26 as arrow 103. Likewise, the lower end of tube 7 opens to chamber 3' and exits through opening 27 as arrow 104. Chambers 3 and 3' are separated by flexible barrier 28. In certain applications arrow 103 and arrow 104 may be arranged to have one flowing inward while the other is flowing outward to achieve continuous circulation and to help the evaporation. In some other cases the flexible barrier 28 is omitted so that only one exit is sufficient to bring the vapor out. The detailed arrangement of specific applications is discussed below.

High temperature vapor 111 will be introduced from inlet pipe 10 through flexible coupling 9 and pipe 8 into the inside chamber 4 of container 3. In contact with the coupler tube 7 the vapor will condense into droplets 25 which splashes inside chamber 4 against the outside surface of tubes 7 and thereby increases the condensation rate. Finally, the condensation will be collected near the bottom edge of chamber 4 and discharged through pipe 11, flexible coupling 12 and drain pipe 13 to become distillate 113. A second vapor passage 14-15-16 with vapor 112 is shown at the lower end of the system. This double ended vapor passage arrangement is needed in the distillation system described later in conjunction with FIG. 7 and is not essential for the desalination system described in conjunction with FIG. 6.

The wobbling drive of FIGS. 1 and 2 exhibits a revolving centrifugal force of the center of mass with respect to its wobbling center. FIG. 3 shows one way to balance the revolving forces by having two sets of concentric wobbling systems with the two mass centers 31 and 32 opposite to each other with respect to their common wobbling center 30. 31 is the mass center of the inner system 33 which is guided by three cranks 51, 52 and 53. 32 is the mass center of the outer system 34 and is guided by three cranks 54, 55 and 56. Both systems have the same wobbling center 30. Two gears 58 and 59 coupled by chain 57 are used to maintain the proper orientation of the two systems.

Figure 4:
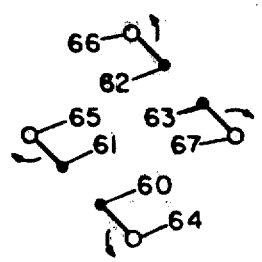
FIG. 4 is a schematic diagram of two pairs of wobbling systems to achieve dynamic balancing.

FIG. 4 shows schematically an arrangement wherein two pairs of wobbling systems are coupled together to achieve dynamic balancing. The four wobbling systems are symmetrical with each other and of the same mass. In the diagram mass centers 60, 61, 62 and 63 are shown to revolve with respect to the respective wobbling centers 64, 65, 66 and 67 and with orientation to provide dynamic balancing.

FIG. 5 shows the operation of a desalination system where vapor is to be evaporated from sea water and recondensed to get distilled water.

Heat energy is provided by a boiler 80 where high temperature steam 92 is generated from feed water 91. This high temperature steam is blended with low temperature vapor 303 to form vapor 111 which is to be condensed in a wobbling evaporator 81 which operates on the same principle as that shown in FIG. 2 but is here shown schematically. The condensate 113 of vapor 111 is channelled as part of of the desired output.

Sea water 101 is admitted to the wobbling evaporator 81 to generate vapor 103. Excessive sea water is flushed out at 102. Heat exchanger arrangements as represented by 115, 215 and 315 are used to recover some of the heat energy in the condensate 113, 114 and 115 and exit flow 102, 202 and 302. Arrows 105, 205 and 305 are used to indicate that in some applications reflux of the sea water may be advisable to achieve higher operation efficiency.

Vapor 103 is directed to a second wobbling evaporator 82 to become input vapor 211 and condensed as distillate water 213. Sea water 201 is admitted to evaporator 82 in the same manner as sea water 101 is admitted to evaporator 81. The same operation, as illustrated for evaporator 81, is thus repeated in evaporator 82 and likewise in evaporator 83, as shown in FIG. 5. As a rule a certain temperature gradient exists between the condensing side and the evaporating side of each stage. For this reason vapor 303 is cooler than vapor 311 which is cooler than vapor 211 and in turn cooler than vapor 111. The total temperature drop across the series of evaporators is then rejuvenated by the boiler 80.

The distillation organization of FIG. 5 would also work if the wobbling evaporators are replaced by conventional condensor-evaporators. However the wobbling evaporator provides a lower temperature gradient per stage than that in conventional condensor-evaporators. There will be a similar gradient between the temperature needed to evaporate sea water and the temperature to condense the same vapor to distilled water in either system. But in addition to this the temperature gradient needed to transfer the heat will be different. For this reason for a given temperature rise or energy input provided by the boiler 80, more stages of wobbling evaporators can be accommodated and therefore more output in distilled water will be produced than with conventional condensor-evaporators.

Figure 6:
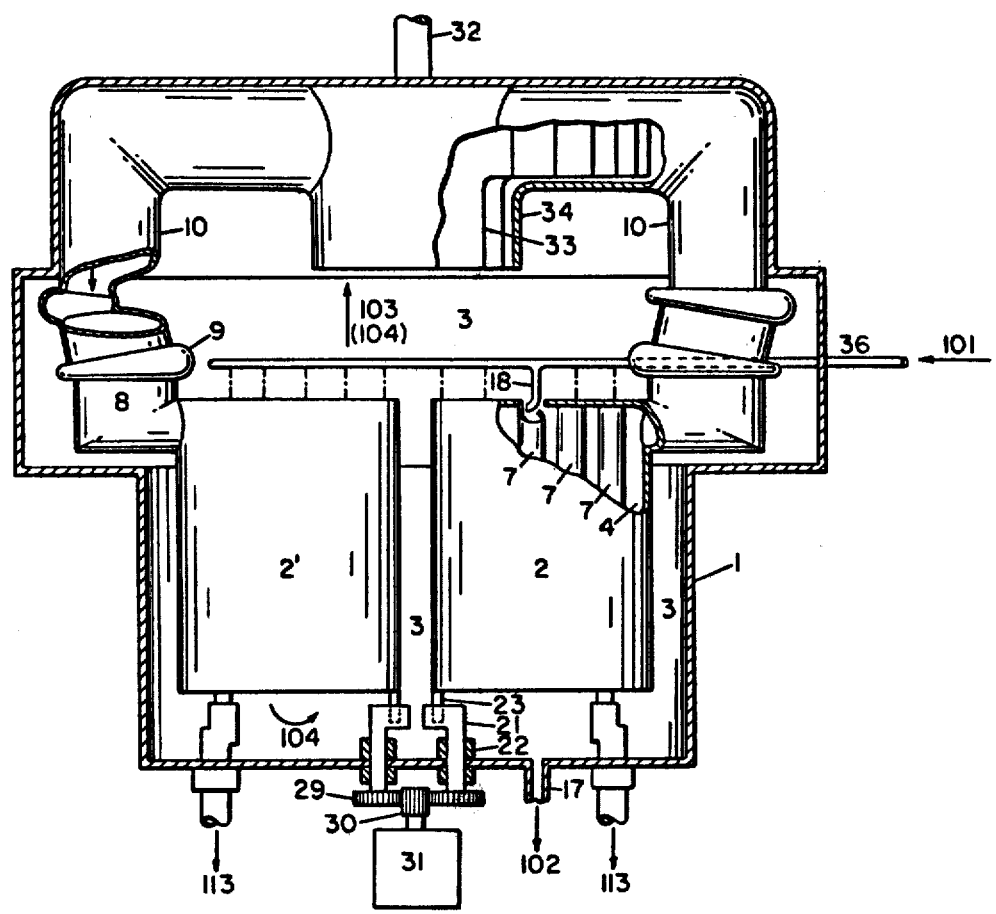
FIG. 6 is an elevation view, with cut out sections, of a vapor compression wobbling drive desalination system.

FIG. 6 shows a wobbling drive vapor compression evaporator where wobbling containers 2 and 2' are shown. These containers are driven to wobble by motor 31 through pinion 30, gear 29 and crank shaft 21 in the same way as in the apparatus of FIG. 2. Sea water 101 is distributed by piping system 36 to the various revolving pipes 18 to discharge into heat transfer tubes 7. Inside tube 7 the sea water will evaporate as vapor 103 or 104 and collect into chamber 3. A centrifugal compressor 33 driven by shaft 32 inside housing 34 will compress vapor 103 into vapor 111 which has a higher pressure and temperature than vapor 103. Vapor 111 is distributed by conduit system 10 flexible coupling 9 and conduit 8 to the inside chamber 4 and 4' of container 2 and 2'. Vapor 111 will be cooled and condensed by tubes 7 with the heat of condensation transmitted through the wall of tube 7 to evaporate sea water inside tube 7 in the same manner as illustrated before for the apparatus of FIG. 2.

The use of the wobbling drive system reduces the temperature gradient and the pressure gradient between the vapors across the heat transfer barriers. The net result is a reduction of the power needed to drive the centrifugal compressor 33 and therefore reduced operating cost of the plant.

FIG. 7 illustrates the general concept of a distillation column for separating two ingredients I and II soluble with each other. In this system fluid film 5 flows downward and a vapor 50 flows upward inside tube 7. The fluid film 5 will start with fluid input 101 at the top and become fluid output 102 at the bottom of the tube 7. The consistency of fluid 101 is strong in ingredient I whereas the consistency of fluid 102 is strong in ingredient II. Both ingredients are mutually soluble like alcohol and water. Likewise vapor 103 is strong in ingredient I and vapor 104 is strong in ingredient II. Along the counter flow paths of the fluid film 5 and vapor in chamber 50 molecules of ingredient I and II exchange across the vapor-liquid interface such that ingredient I is evaporated along the entire length of the tube 7, as represented by arrows 106; and ingredient II are condensed as represented by arrows 107. To support the energy balance, energy 42 is brought either in or out as needed along the length of the column.

Heat exchanger 37 is used to condense the vapor 103 to become fluid 101 whereas heat exchanger 38 is used to evaporate fluid 102 to become vapor 104 and thus close the loop.

Inlet 41 brings in fluid with intermediate consistency in ingredient I and II whereas outlet 39 extracts fluid strong in ingredient I and outlet 40 extracts fluid strong in ingredient II.

The general concept of the distillation column of FIG. 7 is modified in FIG. 8 with the use of two wobbling evaporators—one for the distillation column and one to replace the condensor 37 and evaporator 38. On the left hand side of FIG. 8 the wobbling evaporator 85 is used as the distillation column whereas on the right hand side 86 is used as the dual purpose heat exchanger. In both cases the wobbling drive system is not shown and only one tube 7 and 7' is shown schematically for each system.

For the distillation column the inside column of case 1 is divided into chambers 3 and 3' by flexible barrier 28. Outside the heat transfer tube 7 the condensation chamber 4 of FIG. 2 is now replaced by a sequence of chambers 44. Valves 45 are used to couple chambers 44 with a steam main 45 to bring appropriate amount of energy into each chamber. The diagram is symbolic but shows the elements to be adjusted in accordance with the known characteristics of ingredients I and II utilized in fractionating column design.

The wobbling evaporator 86 is essentially the same as the evaporator of FIG. 2 with the exception that the flexible barrier 28 of FIG. 2 is not needed.

In operation the upper chamber 3 of evaporator 85 supplies vapor 103 which is condensed in chamber 4 of unit 86 to become fluid 101 which is pumped by pump 50 to return to unit 85 and be discharged through revolving tube 18 to coat the inside surface of tube 7. This fluid will be re-evaporated as vapor to fill the chamber 50 and to ascend to chamber 3 to complete the loop. Part of the fluid will flow down the inside surface of tube 7 to reach the lower chamber 3'.

Starting from chamber 3' of unit 85 fluid 102 will be drained from tube 17 and moved by pump 51 to reach the revoling tube 18' of unit 86 to coat the inside surface of tube 7'. The vapor thus generated will fill up chamber 50' and thus collect as vapor 104 to be transported back to chamber 3' of unit 85. Part of the vapor will be condensed into the inside surface of tube 7 and flow down back to chamber 3' and part of the vapor will ascend to chamber 3. Inlet 41 represents an influx of a fluid with intermediate consistency in ingredients I and II. Spray head 43 represents a disc shaped spray head to distribute the fluid evenly to the inside surface of tube 7.

Figure 9:
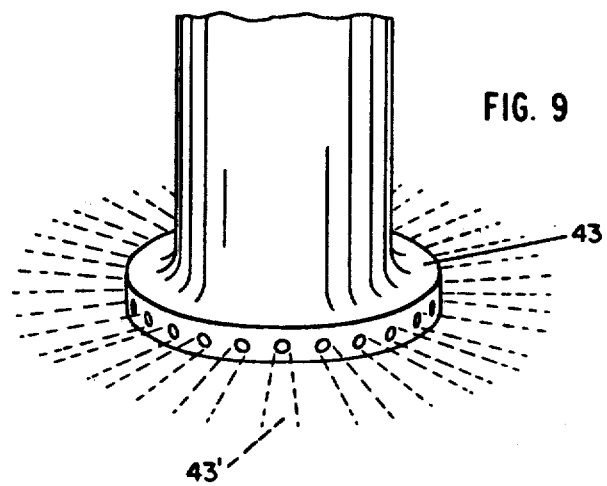
FIG. 9 is a perspective view of a disc-shaped spray head.

Disc shaped spray head 43 and the disc shaped spray 43' as shown in FIG. 9 may be used as an alternate to the revolving tube 18 for distributing the fluid. Tube 18 discharges fluid at the head of the revolving stream 6 of FIG. 2. In so doing it minimizes splashes and thereby avoids the mixing of the salt water mists with the cleam vapor. For distillation operation the spray head 43 used at the middle of the tube offers a simpler mechanical configuration where the mist forming is not objectionable. Pipes 39 and 40 represent the outlets of the fluids which are rich in ingredients I and II respectively.

Pump 52 and the associated pipe-line represent the auxiliary circulation loop of the fluid to be evaporated. An auxiliary fan or a pressurized fan may be needed to circulate the vapor 103 inside the condensing chamber 4.

FIG. 10 shows the end view of an improved distillation apparatus incorporating pairs of heat transfer tubes, and FIG. 11 shows the corresponding elevation view. This device has one main drive shaft 406 which carries two pairs of eccentric bearings 405' and 405, oriented 180° phase angle apart. Eccentric drives 405 and wobbling plates 401 and 401' carry groups of heat transfer tubes 403 and 404. Tubes 403 and 404 are symmetrical with respect to the center of the eccentric so that their combined C.G coincides with the center of the eccentric 405. Likewise Eccentric 405' drives wobbling plates 402 and 402' which carry tubes 403' and 404' whose combined C.G coincides with the center of the eccentric 405'.

The center drive shaft 406 is supported by bearings 430 and 431 which are secured to the main tank via structure members 432 and 433. The upper ends of the four groups of tubes 403, 404, 403' and 404' are capped with channel shaped ring 412 as shown in FIG. 11 to receive fluid which is distributed via tubes 411. FIG. 12 and FIG. 13 show further details of ring 412 and tube 411.

Near the upper ends of the four groups of tubes, a flexible membrane 410 is used to allow the tubes to pass through the perforations in the membrane. Likewise a second flexible membrane 410 is used near the lower ends of the groups of tubes. These two membranes divide the outside space of the tubes into three chambers as described in connection with FIG. 2. These membranes are secured at their outer periphery to the inside surface of the main tank 1. Convolutions 450 are provided on the membranes to allow the tube groups some freedom to wobble with minimum resistance. Because the tubes are arranged symmetrically with respect to the center of the membrane and driven by the eccentric 405 which is also at the geometric center of the tube groups, it follows that the resultant elastic force exerted by the membranes to the tubes always points toward the center of the eccentric. Thus the wobbling drive does not produce a moment to cause angular displacement of the tube assembly, which wobbles but remains oriented in a fixed direction. Furthermore the convolutions 450 of the membrane are shaped in such manner to make it flexible for wobbling motion while being quite rigid so as to resist rotational motion.

The principle of the selective rigidity of the membranes can be illustrated by the universal joint 408 of FIG. 20. This double universal joint 408 is anchored to the frame work at the upper end 409 and is attached to the wobbling member 401 which is driven by eccentric 405 and shaft pivot 406. This universal joint is very rigid in its torsional mode but is flexible in lateral mode. For this reason it provides an excellent guide for wobbling motion. By comparison a membrane is not as rigid a guide as the universal joint but is adequate for most purposes and is economical because it also serves another function, i.e. as the partition for the chambers.

FIG. 12 and FIG. 13 illustrate the construction of a new fluid distribution scheme. Fluid to be evaporated is introduced to the upper ends of the evaporating tubes 403 and 404 via distributing tubes 411 and circular channel rings 412. Each tube 411 is pivoted by a pin 413 and is tensioned by a spring 417 to cause the guide pin 414 to bear against the inside edge 423 of the circular ring 412. Guide pin 414 is an integral part of tube 411. A line drawn between pivot 413 and guide pin 414 is approximately tangent to the circle of the inside edge 423. Thus when the tube wobbles, guide pin 414 will slide back and forth along the edge 423 smoothly and keep the nozzle 416 at a desirable distance from the bottom of the channel 412.

The wobbling motion of the channel 412 will keep the liquid revolving to form a crescent shaped fluid body 418, and overflow down the tube 403 with a revolving stream 419. Since in this arrangement the nozzle 416 does not revolve, it supplies fluid at a stationary point. The large surface 418' of the crescent shaped fluid body 418 serves the function of a reservoir to maintain an ample supply of flow to the downward stream 419. The size of the circular channel is a design choice, a large channel will provide an even head supply of stream 419. However, stream 419 can also adjust itself after flowing down for a certain distance. Thus even without the circular ring the flow stream 419 may reach a steady state a certain distance downward.

Typical design parameters for water as the fluid are 2" diameter copper heat transfer tube with a wobbling radius in excess of $\frac{1}{4}$', a revolving speed in excess of 150 R.P.M. and a flow rate in excess of 1 lb/min. Below these values the fluid flow may not be "synchronized" with the wobbling drive to form a revolving stream to wipe the inside surface of the tube.

FIGS. 14 and 15 show an improved scheme using the wobbling drive to handle fluid with higher viscosity. This is accomplished with a heavy bar 429 which is hung under a revolving arm 427 pivoted at shaft 426 and engaged to the inside surface of the tubes 403 via roller 428. This heavy bar 429 pushes fluid 420 in front of it as it revolves in the direction of arrow 421 to generate a thin film to facilitate the evaporation.

Figure 16:
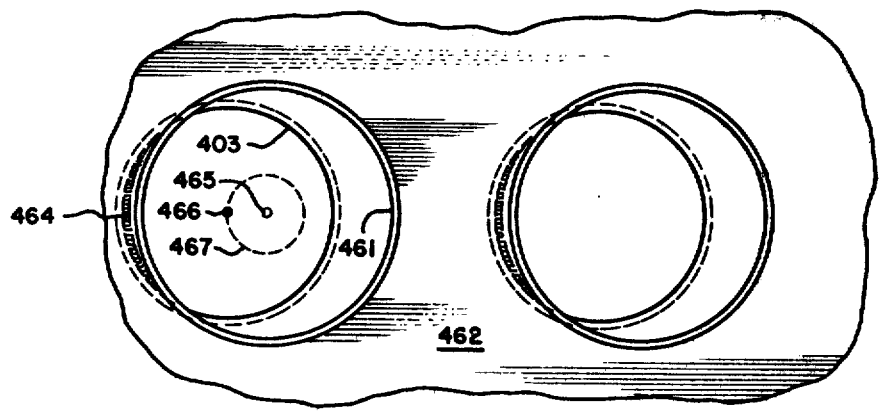
FIG. 16 is an end view of another fluid distribution system.
Figure 17:
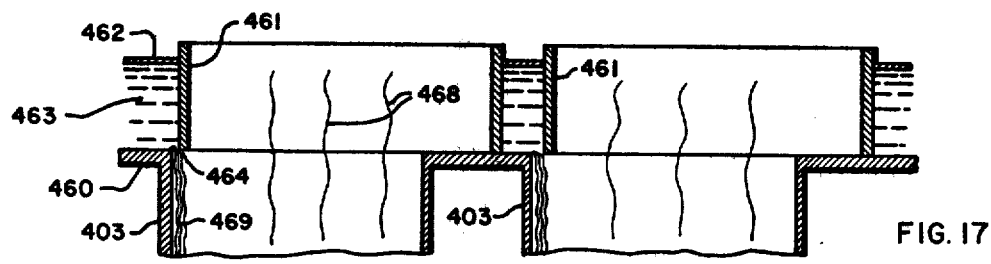
FIG. 17 is an elevation view of the system of FIG. 16.

FIGS. 16 and 17 show another fluid distribution system. In these illustrations two wobbling tubes 403 are shown. They are coupled together at the top by a "valve plate" 460. Short cylindrical "valves" 461 are used to engage with the valve plate 460. These cylindrical valves are held together by plate 462. Incoming fluid is introduced into the space between plates 462, 460 and cylinders 461. Tubes 403 and plate 460 wobble with respect to the cylinder 461 and plate 462. For instance the center 466 of tube 403 traverses around the circular locus 467 with its center 465 coinciding with the center of cylinder 461. This wobbling motion creates a crescent shaped gap 464 which revolves around tube 403 and cylinder 461. This revolving gap allows fluid to drain through to form the revolving stream 469. A portion of this stream is evaporated to form vapor 468 which escapes through the inside of tube 403 and cylinder 461.

Figure 18:
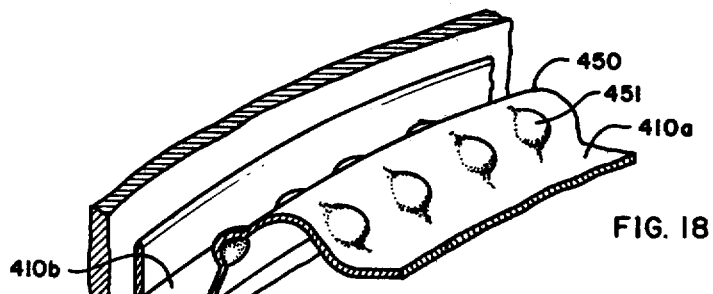
FIG. 18 is a schematic diagram showing details of one configuration of convoluted membrane.
Figure 19:
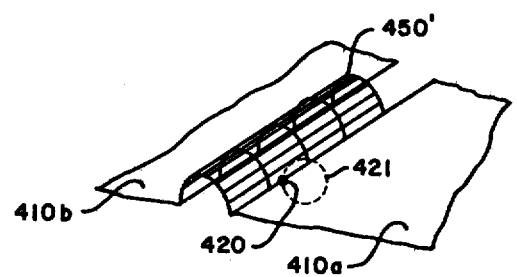
FIG. 19 shows schematically details of another convoluted membrane configuration.

FIG. 18 illustrates in detail one configuration of the convolution 450 of membrane 410. FIG. 19 illustrates a conceptual model of the convolution serving as a wobbling seal. In each figure the membrane 410 is divided into three elements, 410a, 410b and 450 and 450'. FIG. 19 shows that 410a is driven to wobble with respect to 410b in that a typical point 420 on 410a will be driven to describe a circle 421 with respect to element 410b. Convolution 450' of FIG. 19 must therefore provide a seal across the membrane 410 while offering low and uniform elastic constraint against the wobbling motion and a reasonable service life. A typical value of wobbling motion is about $\frac{1}{4}$" radius, while the width of the convolution is about the same order of magnitude. Elastic material such as rubber is adequate for the membrane. However even with a rubber sheet as the material a simple 37 U" shaped convolution is not fully satisfactory because it only permits flexible motion in the direction perpendicular to the length of the convolution. In the shear mode of motion or along the length of the convolution the constraining force increases greatly and will result in buckling of the shape which then offers a non-linear restraining force as well as high local stress. This buckling stress would reduce the service life. The grid 450' of FIG. 19 is a natural yieldable structure which would bridge 410a and 410b to allow wobbling motion between them. One configuration is to use reinforcement fiber to form the rectangular grid pattern and then fill the area of the grid with soft rubber film which can be stretched into diamond shape as the grid is subjected to the shear mode of deformation. Another configuration, shown in FIG. 18, uses homogeneous material with the sheet preformed into ridges with circular bumps 451 to facilitate shear mode deformation. Square bumps between rectangular ridges could be used.

In the improved design described herein, membrane 410 replaces the several inner containers 2s and 2's, the associated flexible couplings 8, 9, 10 etc., and the guiding cranks 51's of the earlier figures.

Although certain preferred embodiments have been described, those skilled in the distillation and evaporation art will recognize that appropriate modifications may be made to meet specific applications without departing from the scope of my invention.

Having thus described my invention I claim:

1. Distillation apparatus comprising
   an even number of pairs of vertically aligned heat transfer tube groups,
   means for mounting each of said pairs of tube groups symmetrically aligned about an associated vertical axis and with two of said pairs of tube groups arranged with a mutual angular displacement that has a criss-cross configuration in a plane transverse to said associated vertical axes, said mounting means including means for restraining said tube groups from rotation about said vertical axis while allowing them to wobble,
   means to drive said mounting means and said pairs of heat transfer tube groups about wobbling centers each associated with one of said pairs of tube groups and located along said associated vertical axis, said drive means including a common drive shaft and a plurality of eccentric drive systems each connected between said drive shaft and an associated one of said pairs of tube groups, said drive means and said mounting means providing a dynamic self balancing of said tube groups during said wobbling, and
   means to direct a stream of fluid toward the inner surface of each of said transfer tubes, the wobbling motion imparted to each of said transfer tubes serving to cause said fluid stream to cling to the inner surface of the transfer tube away from the wobbling center whereby the resulting revolving flow stream serves to wipe the inside surface of the transfer tube to form a thin film with low heat resistance and thus to facilitate evaporation and carry the residue and reflux downward with low resistance.

2. Apparatus according to claim 1 wherein fluid to be evaporated is introduced into said transfer tubes and vapor evaporated from the fluid inside said transfer tubes is introduced into the space surrounding the outside of said transfer tubes, said vapor condensing upon the outer surfaces of said transfer tubes.

3. Apparatus according to claim 1 having two pairs of wobbling transfer tubes, each pairs having a mass center, the mass centers being opposite to each other with respect to a common wobbling center.

4. Apparatus according to claim 2 wherein part of the effluent from the inside of the wobbling transfer tubes is refluxed into the transfer tubes to achieve higher operating efficiency.

5. Apparatus according to claim 2 wherein the vapor from the inside of the wobbling transler tubes is compressed before being discharged into the space surrounding the wobbling transfer tubes.

6. Apparatus according to claim 1 wherein said restraining means includes a double universal joint to maintain tube orientation.

7. Apparatus according to claim 1 wherein said restraining means includes at least one flexible membrane to maintain tube orientation.

8. Apparatus according to claim 7 wherein said membrane incorporates a rectangular reinforcement grid.

9. Apparatus according to claim 7 wherein said membrane incorporates periodic deformations to facilitate shear mode deformation of the membrane.

10. Apparatus according to claim 1 wherein the input fluid is introduced to the inside of the transfer tubes by an injection tube.

11. Apparatus according to claim 10 wherein said injection tube is yieldable, the tip of said injection tube being guided by the associated transfer tube.

12. Apparatus according to claim 10 wherein said transfer tubes have a circular channel at their upper end to receive the fluid and achieve more uniform fluid distribution around the transfer tube.

13. Apparatus according to claim 10 wherein the tip of the bendable injection tube is guided by floatable means to follow the contour of the revolving fluid.

14. Apparatus according to claim 14 incorporating a free-hanging blade driven by the transfer tube to revolve and wipe the inside surface of the tube.

15. Distillation apparatus comprising groups of wobbling heat transfer tubes, each of said transfer tube groups being coupled to a wobbling valve plate at the top of said transfer tubes, a group of fixed cylindrical valves, a backing plate coupled to said cylindrical valves, said cylindrical valves serving to engage with the valve plate to define a confined fluid space between the valve plate, the backing plate and the outside surfaces of the cylindical valves, means to introduce fluid to fill said confined fluid space, said wobbling transfer tubes wobbling with respect to said cylindical valves to form a revolving gap opening to allow the fluid to be drained from the confined fluid space into each wobbling tube in the form of a wobbling stream, said stream wiping the inside surface of the wobbling tube to generate a thin fluid film and facilitate rapid evarporation.

16. Distillation apparatus comprising
a fixed container;
an even number of pairs of heat transfer tube groups located in said container, each said pair of tube groups being aligned about a vertical axis;
a supporting structure for said tube groups that secures each said pair of tube groups substantially symmetrically with respect to said vertical axis;
a vertically aligned drive shaft that extends along a wobbling axis;
eccentric drive means that connects said drive shaft to said supporting structure;
two of said pairs of tube groups being arranged in criss-cross manner with respect to each other and with their associated vertical axes placed diagonally opposite each other with respect to the wobbling axis and driven by said drive shaft and said eccentric drive means to revolve in a wobbling manner with respect to the wobbling axis while remaining in balance with each other;
coupling means to allow said pairs of tube groups to move freely only in a translational wobbling motion mode defined by said revolving but not in a rotational mode with respect to said fixed container, partition means that separate the center section of said tube groups from the two ends of said tube groups within said container, said partition means thereby dividing the inside volume of the container into a first chamber enclosing the outside surfaces of the tube groups and a second chamber comprising all space inside the tube groups;
means to direct an individual fluid stream to the inside of the upper ends of each of said tube, the wobbling motion of each said tube causing the downward flowing fluid stream to revolve inside said tube with turbulence and to leave a thin film at the wake of the revolving stream by its wiping action;
means for directing a fluid media to said first chamber at a temperature different from the temperature of the fluid in said second chamber; and
said turbulence and said wiping action of the wobbling stream increasing the heat transfer rate across each said tube.

17. Apparatus according to claim 16 wherein said fluid media directing means directs vapor to said first chamber at a temperature higher than the equilibrium temperature of the liquid-vapor phase of said fluid film inside said tubes, the resulting temperature gradient causing a heat flow from the outside surface of the said tubes to the inside surface of the said tubes, said heat flow inducing condensation of said vapor at said outside surface whereas the same heat flow induces evaporation of said fluid film inside the tube at said inside surface.

18. Apparatus according to claim 17 further comprising means to collect the condensate from the said first chamber, means to collect the vapor from said second chamber, and means to collect the excess fluid from the said first chamber.

19. Apparatus according to claim 16 wherein said partition means comprises yieldable diaphragms with an elastic property along their borders between said tube groups and between said groups and said container that is soft to offer insignificant restraint against wobbling motion, whereas the same yieldable diaphragms are sufficiently rigid to prevent the tube groups from revolving with respect to said container.

20. Apparatus according to claim 16 wherein said coupling means includes a mechanical non-rotational coupling to provide said rotational rigidity.

21. Apparatus according to claim 20 wherein said mechanical coupling is a universal joint.

22. Apparatus according to claim 16 wherein said fluid media directing means comprises a vapor compressor that directs vapor generated in said second chamber to said second chamber, said compressor providing the required pressure and temperature gradient.

23. Apparatus according to claim 19 wherein at least said borders of said diaphragms are constructed with rubber-like material in the form of deep convolution.

24. Apparatus according to claim 23 wherein the convolution of the diaphragm is constructed with a cross ridge and indentation to relieve the stress in the shear mode of the wobbling motion.

25. Apparatus according to claim 24 whereas said borders of said diaphragms are constructed with rubber-like material imbedded with a grid structure of more rigid and stronger fiber materials.

26. Apparatus according to claim 16 wherein said individual fluid stream directing means includes a non-revolving injection tube.

27. Apparatus according to claim 26 wherein said injection tube is yieldable, the tip of said injection tube being guided by an associated heat transfer tube.

28. Apparatus according to claim 26 wherein said transfer tubes each have a circular channel at their upper end to receive the fluid.

29. Apparatus according to claim 16 further comprising a free-hanging blade, and means for revolving said blade inside the full length of the tube, the mass of the blade providing additional pressure to wipe the fluid into said thin film.

30. Apparatus according to claim 16 wherein said individual fluid stream directing means includes a liquid distribution system consisting of fixed circular guide engaged by said wobbling tubes to provide a revolving opening to distribute the liquid.

31. Apparatus according to claim 16 with a sequence of evaporation units coupled to have the vapor generated by each chamber to be condensed in the succeeding chamber, with descending equilibrium temperature and pressure.

* * * * *